Oct. 21, 1952    L. S. APPLE    2,615,152
DYNAMIC BRAKING SYSTEM
Filed June 6, 1950
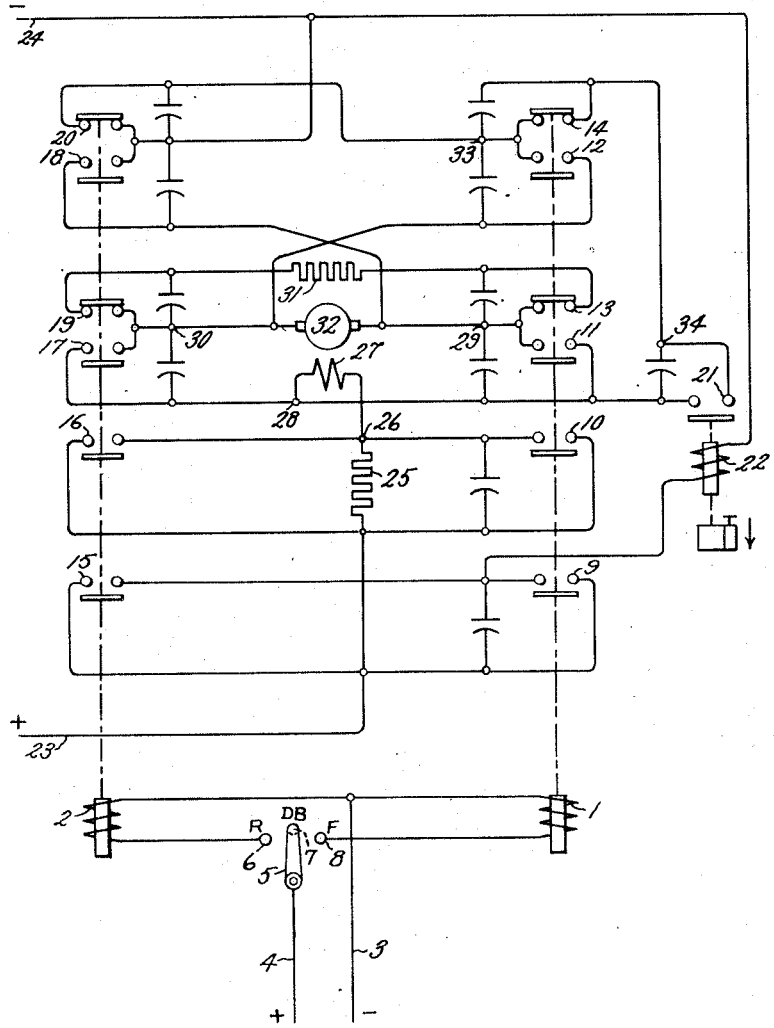
Inventor:
Lee S. Apple,
by Merton D Morse
His Attorney.

Patented Oct. 21, 1952

2,615,152

UNITED STATES PATENT OFFICE 2,615,152

DYNAMIC BRAKING SYSTEM

Lee S. Apple, Syracuse, N. Y., assignor to General Electric Company, a corporation of New York Application June 6, 1950, Serial No. 166,475

2 Claims. (Cl. 318—246)

My invention relates to electric braking systems and, more particularly, to a dynamic braking system for series electric motors.

It is customary to use a series wound motor in cranes, hoists, and the like. Motors are subjected to frequent reversals in applications of this type, and they must be so designed that they can stop quickly. In addition, the motors must be able to stop quickly from either direction of rotation. These stops and reversals should be made with a minimum of damage to the motor and to its bearings.

An important object of my invention is to provide improved means for the rapid dynamic braking of a series electric motor from either the forward or the reverse direction of operation.

Another object of my invention is to provide an improved system for the dynamic braking of a series electric motor wherein the current in the field windings of the motor when the motor is subjected to dynamic braking is greater than the normal running current.

A third object of my invention is to provide means for disconnecting the field windings of a series electric motor from the source of voltage after the motor has been stopped by dynamic braking.

In carrying out my invention in one form thereof, I provide a series electric motor, a resistor for limiting the current in the series field during dynamic braking, a dynamic braking resistor, control means for the motor comprising two directional contactors having part normally open contacts and part normally closed contacts, and a time delay relay having a time delay dropout. When one of the directional contactors is energized, its normally open contacts are closed, thereby energizing the time delay relay and serially connecting the armature of the motor, the series field, and a source of direct potential for forward operation of the motor. When the directional contactor is de-energized, its normally closed contacts connect the armature across the dynamic braking resistor and connect the series field in series with the current limiting resistor and the source of direct potential. The contacts of the other directional contactor perform similar functions for the reverse operation of the motor. During dynamic braking, the directional contactors are de-energized and the contacts of the time delay relay connect the field winding and the current limiting resistor across the source of direct potential until the time delay condition is satisfied.

For additional objects and advantages, and for a better understanding of my invention, attention is now directed to the following description and the accompanying drawing and also to the appended claims in which the features of the invention believed to be novel are particularly pointed out. The single figure of the drawing shows a schematic circuit diagram of a motor control system embodying my invention.

Referring to the drawing, one terminal of each of the operating coils of the directional contactors 1 and 2 is connected to one side of a source of supply by supply conductor 3. A supply conductor 4 connects the other side of the source of supply to the switch 5. Switch 5 is provided with the contacts 6, 7, and 8. The contacts 6, 7, and 8 corresponds to reverse operation, dynamic braking, and forward operation respectively. When the switch 5 engages contact 6 or contact 8, corresponding contactor 2 or 1 is picked up. When switch 5 engages contact 7, both contactors are dropped out for dynamic braking. The normally open contacts or switches 9, 10, 11, and 12, and the normally closed contacts or switches 13 and 14 are all operated by the directional contactor 1. The normally open contacts or switches 15, 16, 17, and 18, and the normally closed contacts or switches 19 and 20 are all operated by directional contactor 2. The normally open contacts 21 are operated by the field de-energizing relay 22 having a time delay dropout. All of the normally open and normally closed contacts employed in my invention have arc suppressing capacitors connected in parallel relation therewith.

A source of direct potential is connected to the dynamic braking system by supply conductors 23 and 24. This source of potential and the source connected through conductors 3 and 4 can be and preferably are separate sources, but they could also be the same source. One end of resistor 25 is connected to supply conductor 23 and the other end of resistor 25 is connected to the junction point 26. One side of each of switches 9 and 15 is connected to supply conductor 23. The other side of each of contacts 9 and 15 is connected to one terminal of the operating coil of the field de-energizing relay 22. The other terminal of this operating coil is connected to supply conductor 24. Switches 10 and 16 are each connected in parallel relation with resistor 25. The series field winding 27 is connected between the junction point 26 and the junction point 28. The normally open switch 11 is connected between the junction points 28 and 29. The normally open switch 17 is connected between the junction points 29 and 30. The normally closed switch 13 is connected between junction point 29 and one end of resistor 31. The normally closed switch 19 is connected between the other side of resistor 31 and junction point 30. The armature 32 is connected between junction points 29 and 30. The normally open switch 12 is connected between the junction points 30 and 33. The normally open switch 18 is connected between junction point 29 and supply conductor 24. Normally closed switch 20 is connected between supply conductor 24 and junction point 33. Normally closed switch 14 is connected between the junction points 33 and 34. Normally open switch 21 is connected between junction points 28 and 34.

When switch 5 is in the forward operating position, terminal 8, directional contactor 1 is energized, and normally open contacts 9, 10, 11, and 12 are closed while the normally closed contacts 13 and 14 are opened. Field de-energizing relay 22 is picked up when contacts 9 close, and the normally open contacts 21 are closed. The motor circuit is completed through supply conductor 23, contacts 10, field winding 27, contacts 11, armature 32, contacts 12, contacts 20, and supply conductor 24. In response to the energization, the motor accelerates to full speed in the forward direction.

If switch 5 is now moved to the dynamic braking position, contact 7, directional contactor 1 is deenergized and all its contacts return to their normal positions. Contacts 9, in opening, interrupt the energizing circuit for the operating coil of time delay relay 22 which, in response to de-energization, begins to time out. Armature 32 is connected in a closed circuit through contacts 13, dynamic braking resistor 31 and contacts 19. Current will now flow through supply conductor 23, resistor 25, field winding 27, contacts 21, 14, and 20, and supply conductor 24 until the time delay requirements of time delay relay 22 are met and contacts 21 open. Resistance 25 may be of such magnitude that a greater current flows through field winding 27 during dynamic braking than during motoring operation. The time delay setting of relay 22 ordinarily is chosen so that contacts 21 will not open until armature 32 has had ample time to come to a standstill.

If switch 5 is now moved to the position for reverse operation, contact terminal 6, directional contactor 2 is energized, time delay relay 22 is energized through contacts 15, and contacts 21 are closed once more. Resistor 25 is short-circuited by contacts 16. Field winding 27 and armature 32 are connected to supply conductors 23 and 24 through contacts 16, 17, and 18. In response to the energization, the motor accelerates to full speed in the reverse direction.

If switch 5 is returned to the dynamic braking position, contact 7, directional contactor 2 is deenergized, resistor 31 is connected across armature 32 by contacts 13 and 19, and the motor is once more subjected to dynamic braking until it comes to a halt.

It is seen that by manipulation of switch 5 the circuit operation can be changed from off immediately to either forward or reverse; from either forward or reverse immediately to dynamic braking and then without further operation of switch 5 automatically to off when the time delay on the relay 22 expires and contacts 21 open; and from either forward or reverse immediately to dynamic braking and then by further operation of switch 5 immediately to either forward or reverse, either to accelerate the motor in the same direction of rotation or to plug the motor to a halt and then accelerate the motor in the opposite direction of rotation.

The following is one set of circuit parameters that was found to give satisfactory operation with a 120 volt source of potential, and these parameters are here supplied as an illustration of one embodiment of my invention:

$R_{25}$ ------------------------------- 20 ohms
$R_{31}$ ------------------------------- 5 ohms
$K_{22}$ (Time-delay-on-release) ____ 0.5 second
Motor _____ $\frac{1}{6}$ horsepower While the present invention has been described by reference to particular embodiments thereof, it will be understood that this is by way of illustration of the principles involved and that those skilled in the art may make many modifications in the arrangement and mode of operation. Therefore, I contemplate by the appended claims to cover any such modifications as fall within the true spirit and scope of this invention.

What I claim as new and desire to secure by Letters Patent of the United States is:

1. A control system for an electric motor having a series field winding, comprising connections to a source of electrical potential, control means having an energized position in which said motor is operating and a de-energized position in which said motor is not operating, first switch means operated responsively to the energization of said control means for serially connecting the armature of said motor and said series field winding to said source whereby the rotor of said motor rotates, a dynamic braking resistor, means including second switch means which are closed upon the de-energization of said control means for short-circuiting the armature of said motor through said dynamic braking resistor for the dynamic braking thereof, a second resistor, and means for connecting said second resistor and said series field winding in a series circuit for energization from said source for a predetermined interval beginning when said contol means becomes de-energized in order to maintain the energization of said field winding at a relatively high value for this predetermined interval, said last-named means including third switch means operated responsively to the operation of said control means for shunting said second resistor when said control means is energized and unshunting it when said control means is de-energized, fourth switch means operated by said control means and arranged to be open when said control means is energized and closed when it is de-energized, time delay means having contacts which are closed when the time delay means is energized and which opens these contacts when the time delay means becomes de-energized after the expiration of an interval approximately equal to said predetermined interval, said fourth switch means and said contacts being connected in said series circuit with said field winding and said second resistor, and fifth switch means operated by said control means for energizing said time delay means when said control means is energized and de-energizing said time delay means when said control means becomes de-energized, whereby said time delay means drops out after a time approximately equal to said predetermined interval and de-energizes said series circuit including said field winding by opening said contacts.

2. A control system for an electric motor having a series field winding, comprising connections to a source of electrical potential, a pair of contactors, switch means operated by one of said contactors and effective upon the energization of said one contactor for serially connecting the armature of said motor and said series field winding to said source whereby said motor is operated in one direction, additional switch means operated by the other of said contactors and effective upon the energization of said other contactor for serially connecting said armature and said series field winding to said source with the polarity of either the armature or the field winding reversed whereby said motor is operated in the other direction, a dynamic braking resistor, means including a first pair of serially connected switches which are closed respectively by said two contactors when they are de-energized for short-circuiting the armature of said motor through said dynamic braking resistor for the dynamic braking of said motor when both said contactors become de-energized, a second resistor, and means for connecting said second resistor and said series field winding in a series circuit for energization from said source for a predetermined interval beginning when both said contactors become de-energized in order to maintain the energization of the said field winding at a predetermined relatively high value for a time after the beginning of dynamic braking approximately equal to this predetermined interval, said last-named means including a first pair of parallel connected switches operated respectively by said two contactors for shunting said second resistor when either of said contactors is energized and unshunting it when both are de-energized, a second pair of serially connected switches operated respectively by said two contactors and arranged to be open when said contactors are energized and closed when they are de-energized, a time delay relay having contacts which are closed when the relay is energized and which opens these contacts when the relay becomes de-energized after a second interval approximately equal to said predetermined interval, said second pair of serially connected switches and said contacts being connected in said series circuit with said field winding and said second resistor, and a second pair of parallel connected switches operated respectively by said contactors for energizing said time delay relay when either of said contactors is energized and de-energizing said time delay relay when both of said contactors become de-energized whereby said time delay relay drops out after said second-mentioned interval and de-energizes said series circuit including said field winding by opening said contacts.

LEE S. APPLE.

REFERENCES CITED

The following references are of record in the file of this patent:

UNITED STATES PATENTS

| Number | Name | Date |
| --- | --- | --- |
| 1,425,648 | Harvey | Aug. 15, 1922 |
| 2,229,414 | King | Jan. 21, 1941 |